Patented June 18, 1946

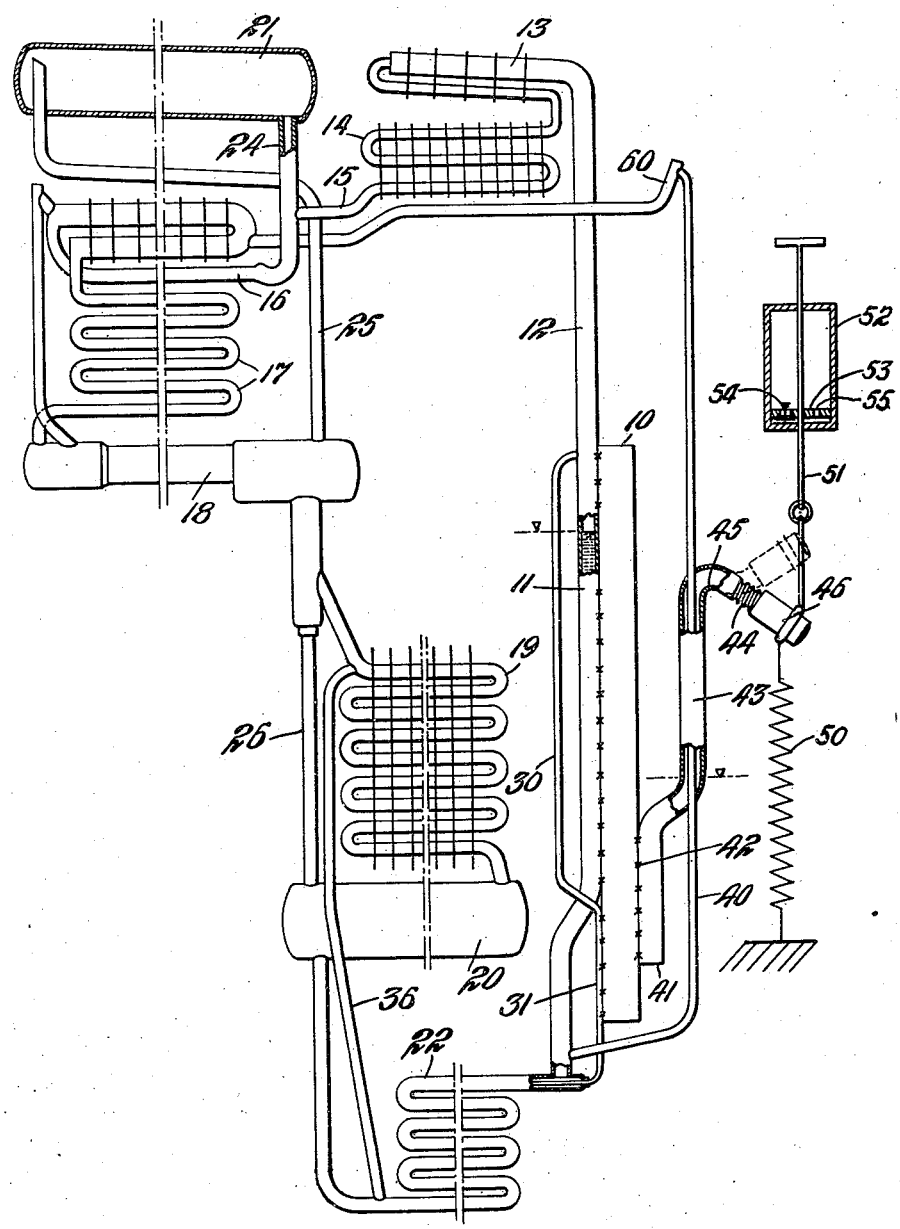

2,402,417

UNITED STATES PATENT OFFICE 2,402,417

REFRIGERATION

Wilhelm Georg Kögel and Nils Erik Widell, Stockholm, Sweden

Application December 1, 1943, Serial No. 512,466
In Sweden January 14, 1943

7 Claims. (Cl. 62—119.5)

Our invention relates to a method and an apparatus for heat transfer by fluid and more particularly for heat transfer by absorption solution for removal of frost from an evaporator of an absorption refrigerating apparatus. It is an object of the invention to provide a self-stopping heat transfer system in which a heat transfer medium together with an auxiliary medium is vaporized and condensed, the condensation heat being used for heating and moving absorption solution within an absorption refrigeration unit. It is another object of the invention to remove frost quickly, and a further object is to provide a self-stopping method and apparatus for this frost removal.

We utilise absorbing solution heated in an auxiliary pump to heat frost on the evaporator and to cause it to melt, said absorption solution being withdrawn from the normal circulation system of the absorption solution by means of the auxiliary pump. For supplying heat to the auxiliary pump we further provide a hermetically closed heat transfer system in which a heat transfer medium and an auxiliary medium is enclosed. Our invention will be more fully explained in the following description in connection with the accompanying drawing which shows diagrammatically a heat operated refrigerating apparatus embodying one form of the invention. The refrigerating system is of the hermetically closed type working with an inert gas such as hydrogen and, for example, ammonia and water as refrigerant and absorbent respectively.

Referring to the figure the refrigerating system includes a generator 11, a rectifier 13 and an aircooled condenser 14. The generator is provided with a flue 10 and is arranged to be heated by an oil burner, a gas flame or an electric heater not shown in the figure. The generator 11 and the absorber 19 are interconnected by members including an absorber vessel 20 and a liquid heat exchanger 22 for circulation of absorption liquid therethrough and therebetween. The circulation of the absorbent is caused by a vapor lift conduit 30 which is in a zone 31 heat connected to the flue 10. The generator 11 is connected by a conduit 12 to the rectifier 13. The condenser 14 is connected by conduits 15 and 16 to the upper part of the evaporator 17 for flow of liquid from the condenser to the evaporator. The evaporator is located in the upper part of a refrigerator storage compartment not shown in the figure. The evaporator 17 and the absorber 19 are interconnected by members including a gas heat exchanger 18 and a conduit 26 for circulation of gas therethrough and therebetween. The absorber is aircooled. A pressure vessel 21 is connected to the gas heat exchanger 18 by a conduit 25 and further to the upper part of the evaporator 17 by means of a drainage conduit 24. Poor solution is supplied to the absorber by a conduit 36.

The system contains refrigerant fluid, a liquid absorbent therefor and an inert gas. These fluids may be for instance ammonia, water and hydrogen respectively. Ammonia vapor is distilled from solution by heating in the generator 11. Ammonia vapor is condensed to liquid in the condenser 14. Liquid ammonia evaporates and diffuses into hydrogen in the evaporator 17 producing refrigerating effect. Ammonia vapor is absorbed out of the gas into solution in the absorber 19. The manner of operation of a refrigerating apparatus of this kind is well known and will not be described more fully herein.

According to our invention we provide an auxiliary vapor lift conduit 40 the lower end of which communicates for example with the lower part of the boiler tube 11. The pump conduit 40 terminates at its upper end in the conduit 60 or in another part of the system from which liquid lifted by the auxiliary pump may flow into the evaporator 17.

Different from the generator 11 and the liquid pump 30 the vapor lift pump 40 is not arranged in direct heat conducting relation to the heating tube 10. The heat supply to the auxiliary pump is obtained by intermedium and a hermetically closed heat transfer system. This system includes a tube, the lower end 41 of which is closed and which is arranged in heat conductive relation to the flue 10, for instance along a welded zone 42. The upper part 43 of the heat transfer system is arranged in heat conductive relation with the vapor lift pump 40, for instance by welding or, as shown in the figure, by arranging said pump pipe within the system. The upper end 45 of the tube is inclined as shown in the figure and by intermedium of a flexible pipe 44 connected to a condenser vessel 46, so that the system is hermetically closed. Due to the flexible pipe 44, the vessel 46 may be lifted into the position designated in the figure by dotted lines.

According to our invention we enclose in the heat transfer system a distinct quantity of a heat transfer medium such as xylol, kerosene or the like having a high boiling point. We take such a quantity of said liquid which, when distilled from the heat receiving part to the condenser vessel 46 of the system effects a transmittance of heat to the evaporator 17 by the vapor lift pump 40 sufficient for removal of the frost from said evaporator. A definite part of the heat transferred by the vapor of the heat transfer medium is supplied to the auxiliary pump 40, the other part of the heat is withdrawn from the system by intermedium of the vessel 46. The ratio between said quantities of heat may be varied within wide limits by varying the amount of the cooling effect of the vessel 46. If said vessel is kept in the position indicated in the figure, the condensate of the heat transfer medium is not able to flow back into the boiler part of the system but is accumulated in the vessel 46. Accordingly, after a certain interval of time, all heat transfer medium is accumulated, the heated part of the system thus containing superheated vapor only. Due to this fact the transfer of heat from the flue tube 10 to the auxiliary pump 40 is interrupted. As a result the defrosting period of the refrigerator is automatically terminated. The dry-boiling of the system, however, has a further consequence, a heavy superheating of the tube walls. Therefore, when the next period of operation is started by emptying the vessel 46, a very rapid boiling is obtained which would cause a boiling over of the liquid back into the vessel 46.

In order to make it possible to bring said vessel back into its normal position immediately after its emptying, it is necessary to prevent such an uncontrollable overboiling of liquid. According to our invention this is obtained by a temporary increase of the pressure in the system. We enclose in the system an auxiliary medium, a second liquid, having a lower boiling point than that of the heat transfer medium. As an auxiliary medium we prefer to use ethyl alcohol. The ratio between the quantity of heat transfer medium and that of auxiliary medium may be varied within wide limits, but generally there may be used equal quantities of the two liquids. In many cases a much smaller quantity of the auxiliary medium has to be used. The introduction of an auxiliary medium having a much lower boiling point than the heat transfer medium results in a very rapid increase of the pressure in the system at the moment of emptying the vessel 46 into the superheated parts of the system. When the liquid flowing from the vessel has reached the upper part 43 of the tube, said part having a medium temperature, the alcohol begins to evaporate, and as a result the pressure in the system will increase rapidly. Accordingly, the boiling temperature of the heat transfer medium will be raised. Therefore, when reaching the hottest part of the heat transfer system, the liquid consists of merely pure heat transfer medium, most of the auxiliary medium having been evaporated at the higher located parts of the system. Due to the increased pressure there will be no rapid boiling of the heat transfer medium, but a controllable evaporation which does not result in an overboiling of liquid into the vessel 46. As mentioned, the vessel is to be brought back into its normal position immediately after its emptying.

Instead of kerosene and ethyl alcohol there may be used a great many other substances as heat transfer medium and auxiliary medium respectively, chemically resistant against the high temperature and having boiling points on the one hand high enough to permit a boiling of the absorben in the auxiliary pump but on the other hand sufficiently different to cause a great increase of the pressure before the heat transfer medium reaches the superheated parts of the system. As to manufacturing of the heat transfer system we prefer to have the system evacuated before introducing the liquid. In many cases, for instance, when there arise difficulties which cause too great a part of the vapor to condense in the vessel 46, we prefer to introduce in the system a non-condensable gas, such as hydrogen, nitrogen or argon. Due to the fact that the vapor of the heat transfer medium has a greater gravity than the inert gas, this gas will remain in the vessel 46, thus obtaining a decrease of the condensation in said vessel. The condensation in the vessel 46 may also be varied by providing a heat insulation or cooling means respectively on said vessel.

As mentioned, the defrosting period is started at will by emptying the vessel 46, this operation being generally finished within a very short time, a couple of seconds to one minute. After having been emptied the vessel has to be brought back into its normal position, and we prefer to provide automatically acting means for this operation, means for keeping the vessel in the emptying position for a definite interval of time. For this purpose a spring 50 may be provided which constantly acts to move the vessel to its normal position and a manually actuated rod 51 may be provided for moving the vessel against the action of the spring to its emptying position. Also a dash-pot 52 may be provided for delaying the return of the vessel to its normal position under the action of the spring 50. The dash-pot 52 may take the form of a liquid container surrounding the actuating rod 51 with a piston 53 attached to the rod and having a valve 54 for permitting movement through the liquid in the container in one direction and a small orifice 55 for restricting the flow of liquid for retarding movement of the rod in the opposite direction.

Finally we wish to mention as an example something about the properties of the heat transfer system according to our invention. The system may for instance contain 10-20 cc. xylol and 3-8 cc. ethyl alcohol, said system having a defrosting period, that is, a period of heat transmitting, of 2-6 hours. At the beginning of the heat transfer period, the temperature of the heat delivering part of the system increases very rapidly, and as a result an effective defrosting at once begins. The temperature then remains substantially constant for several hours. At the end of the defrosting period the temperature suddenly decreases due to the dry boiling of the heat receiving parts of the transfer system. In order to secure the vaporization in the upper parts of the system, these parts may be provided with delaying means which prevent the liquid from flowing back too rapidly into the hottest parts of the system. Instead of xylol there may be used other members of the aliphatic or cyclic hydrocarbons as heat transfer medium, and as auxiliary medium there may be used several alcohols. Preferably the auxiliary medium and heat transfer medium should be soluble in each other. By using water as heat transfer medium there may be used methyl or ethyl alcohol as auxiliary medium. In many cases there may be used also more complicated compounds as heat transfer medium, for instance pyridine, aniline and certain terpenes.

Reference is made to our prior copending application S. N. 475,334, filed Feb. 10, 1943, for generic claims directed to the secondary heat transfer system.

Our invention may be changed or modified in

What we claim is:

1. In a manner of transferring heat with the aid of a vaporization-condensation system having a heated vaporization part, the steps of withholding liquefied heat transfer fluid from said heated part, flowing the withheld liquid to said heated part when heat transfer is desired, and creating in said system an increase of pressure prior to the entrance of said liquid into said heated part to increase the boiling temperature of the liquid, thereby preventing resurgence of liquid from said heated part.

2. The method steps as set forth in claim 1 in which said increase of pressure is obtained by vaporization of an auxiliary fluid having a lower boiling point than that of the heat transfer fluid.

3. A vaporization-condensation heat transfer system having a heated vaporization part and a part adapted to contain and withhold liquefied heat transfer fluid from said heated part, said withholding part being also adapted for delivery of liquid therefrom to said heated part when heat transfer is desired, and means for increasing the pressure in said system prior to entrance of liquefied heat transfer fluid into said heated part to increase the boiling temperature of the liquid whereby to prevent resurgence of liquid from said heated part.

4. A heat transfer system as set forth in claim 3 in which said means for increasing the pressure utilizes vaporization of an auxiliary fluid having a vapor pressure greater than that of the heat transfer fluid when said fluids are at the same temperature.

5. A vaporization-condensation heat transfer system having a heated vaporization part and a part for accumulating liquid and withholding the liquid from said heated part, said system being so constructed and arranged that liquid may be delivered from said withholding part to said heated part when heat transfer is desired, said system containing a heat transfer fluid having a predetermined boiling point and an auxiliary fluid having a lower boiling point, and said system being so constructed and arranged that liquid being delivered from said withholding part to said heated part flows through another part the temperature of which is between the temperatures of the vaporization part and the accumulating part to cause vaporization of the auxiliary fluid.

6. A heat transfer system as set forth in claim 5 in which said another part forms the condensation section of the system from which the transmitted heat to be used is emitted.

7. An absorption refrigeration system having a generator, a condenser, an evaporator, and an absorber interconnected for the circulation of refrigerant and absorbent, a heat operated part adapted for operation by a vaporization-condensation heat transfer system having a heated vaporization part and a part adapted to selectively withhold liquefied heat transfer fluid from said heated part and deliver the withheld liquid to the heated part when heat transfer is desired, said system containing a heat transfer fluid and an auxiliary fluid having boiling points which differ substantially.

WILHELM GEORG KÖGEL.
NILS ERIK WIDELL.